United States Patent

Brinken et al.

[11] Patent Number: 5,988,986
[45] Date of Patent: Nov. 23, 1999

[54] METHOD AND DEVICE FOR MONITORING SYSTEM UNITS BASED ON TRANSMISSION OF LUMPED CHARACTERISTIC NUMBERS

[75] Inventors: Frank Brinken, Buonas; Michael Heinen; Peter Blume, both of Zürich, all of Switzerland

[73] Assignee: Maag Pump Systems Textron AG, Zuerich, Switzerland

[21] Appl. No.: 08/939,648

[22] Filed: Sep. 29, 1997

[30] Foreign Application Priority Data

Sep. 28, 1996 [EP] European Pat. Off. .............. 96115599

[51] Int. Cl.$^6$ ...................................................... F04B 49/00
[52] U.S. Cl. ............................................. 417/53; 417/63
[58] Field of Search ........................................ 417/53, 63

[56] References Cited

U.S. PATENT DOCUMENTS

| | | | |
|---|---|---|---|
| 3,779,457 | 12/1973 | Cornyn, Jr. et al. | 235/151.3 |
| 4,086,434 | 4/1978 | Bocchi . | |
| 4,489,551 | 12/1984 | Watanabe et al. | 60/328 |
| 4,622,538 | 11/1986 | Whynacht et al. . | |
| 4,998,097 | 3/1991 | Noth et al. | 340/648 |
| 5,201,636 | 4/1993 | Mikulski | 417/18 |
| 5,314,016 | 5/1994 | Dunham | 166/250 |
| 5,332,366 | 7/1994 | Anderson . | |
| 5,485,491 | 1/1996 | Salnick et al. | 376/245 |
| 5,533,413 | 7/1996 | Kobayashi et al. . | |
| 5,820,350 | 10/1998 | Mantey et al. | 417/45 |
| 5,846,056 | 12/1998 | Dhindsa et al. | 417/44.2 |

FOREIGN PATENT DOCUMENTS

| | | |
|---|---|---|
| 0 189 021 | 7/1986 | European Pat. Off. . |
| 0 264 148 | 4/1988 | European Pat. Off. . |
| 0 675 369 | 10/1995 | European Pat. Off. . |

*Primary Examiner*—Charles G. Freay
*Assistant Examiner*—Ehud Gartenberg
*Attorney, Agent, or Firm*—Evenson, McKeown, Edwards & Lenahan, PLLC

[57] ABSTRACT

A method is provided for monitoring the operating status of one or more pumps, particularly gear pumps, whereby system parameters are determined by a corresponding measuring device. The system parameters are subsequently processed in a local evaluation unit into characteristic numbers. Finally at least some of the characteristic numbers determined in the local evaluation unit are transmitted from the pump and/or the local evaluation unit to the central evaluation unit. Based on the characteristic numbers, the operating status of the pump is determined and if necessary, an appropriate action is triggered.

13 Claims, 1 Drawing Sheet

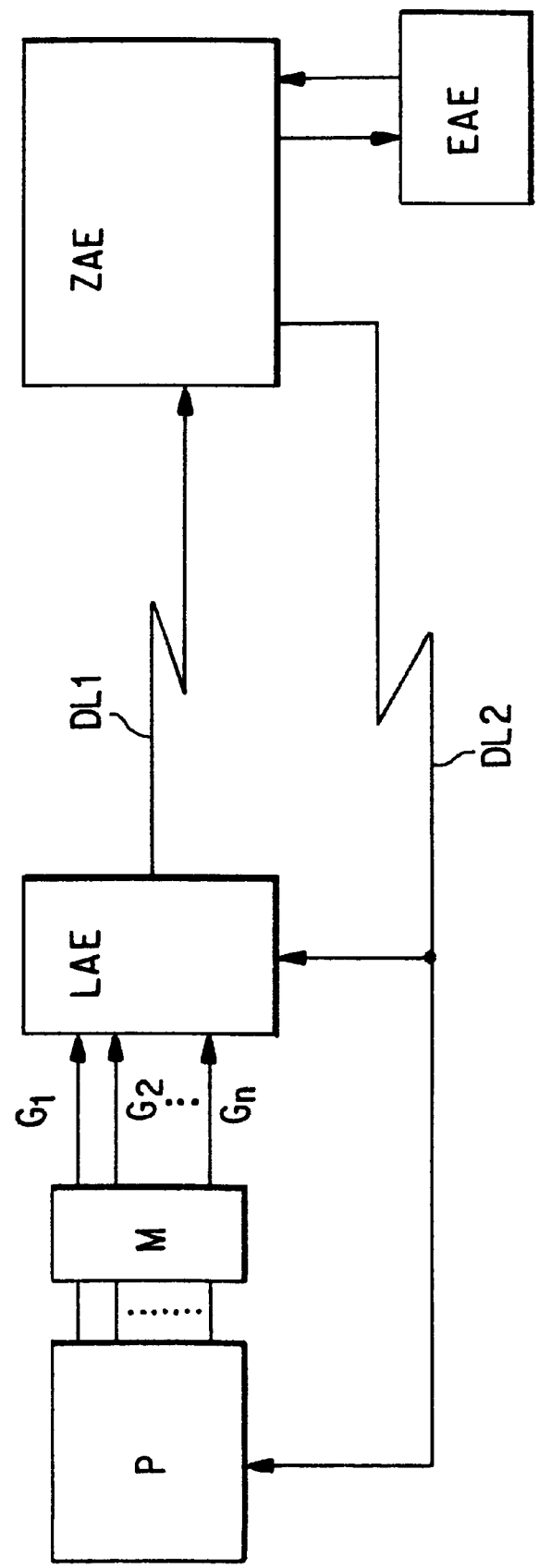

METHOD AND DEVICE FOR MONITORING SYSTEM UNITS BASED ON TRANSMISSION OF LUMPED CHARACTERISTIC NUMBERS

BACKGROUND AND SUMMARY OF THE INVENTION

The present invention relates to a method for monitoring the operating status of a pump, particularly a gear pump, and to a device for practicing the method, as well as an application of the method.

System units or components of a system such as pumps are, for example, being designed more simply for cost reasons or being designed for a significantly expanded operating range. This increases the potential for a failure, however.

One early warning signal of a failure may be that the operating range limits are being exceeded with increasing frequency or the operating range is changing very gradually. There are many possible causes for this, ranging, in pumps for example, from wear in general to the clogging of flow channels relevant to the pump's operation.

Hence the goal of the present invention is to provide a method whereby pumps can be monitored in simple fashion.

This goal is achieved by the method for monitoring the operating status of a pump, particularly a gear pump. The method determines system parameters with a measuring device and processes system parameters in a local and/or a central evaluation unit. At least some of the system parameters and/or at least some of the processing results determined in the local evaluation unit are transmitted from the pump and/or the local evaluation unit to the central evaluation unit. Based on the system parameters and/or the processing results determined in the local evaluation unit, information is obtained on the operating status of the pump and/or possible future events in the pump. Advantageous embodiments of the invention, a device for carrying out the method, and an application of the method are described herein.

The invention has the following advantages: by continuous or periodic detection of various operating parameters, hereinafter called system parameters, an operating failure of a pump is detected early. This is of much significance in large systems, but even in the event of a brief failure of one single pump, the total system has to be shut down. Consequently, not only are significant expenses incurred by the entire system being shut down, but there is a long run-in phase when it is started up again.

Central pump monitoring is, however, advantageous in small systems as well, particularly because for example, trained personnel are not available on the spot to monitor pump operation. In this case, a central evaluation unit may be provided by the manufacturer for example which can give appropriate recommendations to the operator.

Other objects, advantages and novel features of the present invention will become apparent from the following detailed description of the invention when considered in conjunction with the accompanying drawings.

BRIEF DESCRIPTION OF THE DRAWING

The FIGURE is a schematic block diagram of the device according to the present invention.

DETAILED DESCRIPTION OF THE DRAWING

The single FIGURE shows schematically a device according to the invention consisting of a system unit P, a measuring device M, a local evaluation unit LAE, a central evaluation unit ZAE, and an intake/output unit EAE. System unit P is the unit or system component to be monitored. For example, system unit P is a pump, preferably designed as a gear pump.

Measuring device M is intended to determine system parameters G1 through Gn of system unit P. For this reason, as can be seen from the FIGURE, several connections exist between measuring device M and system unit P, preferably corresponding to the number of system parameters G1 to Gn to be determined, obtained on the output side of measuring device M and sent to local evaluation unit LAE.

The arrangement of system unit P and measuring device M is generally known and does not need to be explained in greater detail at this point.

As already mentioned, system parameters G1 through Gn are sent to local evaluation unit LAE in which they are processed in various possible ways. One possibility is for system parameters G1 through Gn to be transmitted without direct further processing in so-called data packets via a data channel DL1 to central evaluation unit ZAE. A second, and preferable, possibility is for system parameters G1 through Gn to be preprocessed in local evaluation unit LAE. This is achieved by data channel DL1 having to have a lower transmission capacity than when all system parameters G1 through Gn are transmitted over data channel DL1.

In another embodiment of the invention, both the preprocessed system parameters G1 through Gn and some of the system parameters G1 through Gn—particularly those not involved in preprocessing—are transmitted over data channel DL1 to central evaluation unit ZAE.

Central evaluation unit ZAE collects and processes. Data received, and provision is made such that a plurality of local evaluation units LAE transmit their information to the same central evaluation unit ZAE.

Data channel DL1 is built into the telephone system, a computer network, or the like.

In addition, a second data channel DL2 is provided. data channel DL2 is used to send information from central evaluation unit ZAE to local evaluation unit LAE and/or to system unit P. This makes it possible for a central evaluation unit ZAE to affect local evaluation unit LAE and/or system unit P directly and without delay. It is possible for example for an emergency situation to arise in system unit P that makes it necessary to shut it off immediately to avoid system damage.

Such direct actions on the part of central evaluation unit ZAE are to be regarded as exceptions, however. Indeed, the particular goal of monitoring system unit P should be to detect an impending failure as early as possible so that the proper measures can be taken to prevent the failure.

Further details will be given below on the method according to the invention, particularly the preprocessing of system parameters G1 through Gn in local evaluation unit LAE for use in gear pumps.

The method steps explained in the previous paragraphs are particularly suitable for monitoring gear pumps. The following measurable parameters in particular are the system parameters G1through Gn involved in this application: throughput, leaks through bearings, bearing temperature, delivery monitoring (especially by feedback), body noise, various pressures (particularly in the intake line upstream of the seal, i.e. for example $\Delta p$ across the pump or $\Delta p$ across the bearing due to pressures on the intake side, output side, and upstream of the seal), time determination for time assignment, rpm, determination of mixed friction, metal detector upstream and downstream of pump, viscosity in characteristic ranges, temperature of material delivered upstream and downstream of pump, and driving torque.

The local evaluation unit determines characteristic numbers K1 through K4 based on one or more of these system parameters, and these numbers give information on the operating status of the gear pump being used. In one preferred embodiment of the invention, only characteristic numbers K1 through K4 are transmitted to central evaluation unit ZAE. This places only a slight demand on the transmission capacity of the data channel, and this in turn significantly increases the number of system units P served by a central evaluation unit ZAE.

Because of characteristic numbers K1 to K4, it is possible for central evaluation unit ZAE to detect relevant changes and, in the event of impending failure, either take measures to avoid it or promptly switch over to a backup unit.

Data collection and processing of characteristic numbers K1 through K4 to be explained more precisely is preferably continuous while forwarding the characteristic numbers K1 through K4 to central evaluation unit ZAE can be either periodic or continuous.

The physical and/or technical and/or operating parameters monitored at system unit P must be selected such that there is a reproducible relationship between the system parameters G1 through Gn measured or monitored and the interpretation of characteristic numbers K1 through K4, i.e. between these system parameters G1 through Gn and the action triggered by characteristic numbers K1 through K4, to prevent false alarms and inappropriate interventions in the operating situation.

It has been shown that a gear pump can be monitored particularly well when the characteristic numbers K1 through K4 chosen are a delivery number K1 which is the relationship between the deviation from the ideal throughput of the pump and the ideal throughput, an energy number K2 which is the relationship between a measured heat energy and the energy converted as a result of fluid friction, a load number K3 which is the relationship between the bearing load and the bearing capacity, and a leak path number K4 which is the relationship between the differential pressures between the intake side, the output side, and upstream of the seal.

The following preferred relationships are used for the aforementioned characteristic numbers K1 through K4:
For delivery number K1

$$K_1 = 1 - \frac{a}{b \cdot c}$$

where
a=leak
b=rpm
c=specific delivery volume and where the term "specific delivery volume" means the fluid volume theoretically deliverable per revolution; for energy characteristic number K2

$$K_2 = \frac{a - b \cdot c \cdot d}{e \cdot f \cdot g}$$

where
a=drive power
b=specific delivery volume
c=differential pressure
d=rpm
e=temperature difference
f=leak
g=delivered material constant
and where the delivered material constant g used is one-quarter of the density multiplied by the thermal capacity; for bearing load number K3

$$K_3 = \frac{a \cdot b}{\left\{\frac{c}{d \cdot e} - f\right\} \cdot g}$$

where
a=radial bearing play
b=geometry factor
c=drive power
d=rpm
e=differential pressure
f=specific delivery volume
g=Sommerfeld number
and where geometry factor b is defined as follows:

$$b = \frac{h \cdot i \cdot k \cdot l}{m}$$

where
h=center distance
i=gear width
k=$\Pi^3$ (pi-cubed)
l=(bearing diameter)$^3$
m=(bearing width)$^2$
and for leak path number K4

$$K_4 = \frac{a - b}{c - a}$$

where
a=pressure downstream of bearing (i.e. upstream of seal)
b=intake pressure
c=pressure on output side Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for monitoring an operating status of a pump, the method comprising the steps of:

acquiring system parameters of the pump with a measuring device;

processing the system parameters in a local evaluation unit by calculating to lump at least three of said system parameters into one or more characteristics numbers;

transmitting from the local evaluation unit to a remote central evaluation unit said characteristic numbers calculated by said processing step in said local evaluation unit;

wherein the central evaluation unit, based on said characteristic numbers transmitted by said local evaluation unit, determines at least one of a current or future operating status of the pump.

2. Method according to claim 1, wherein the system parameters are acquired continuously while the characteristic numbers are transmitted periodically to the central evaluation unit.

3. Method according to claim 1, wherein four characteristic numbers are determined, comprising:
   a delivery number which is a relationship between a deviation from an ideal throughput of the pump and an ideal throughput;
   an energy number which is a relationship between an actual heat energy and an energy converted as a result of fluid friction;
   a load number which is a relationship between a bearing load and a bearing capacity; and
   a leak path number which is a relationship between differential pressures at an intake side, an output side, and upstream of a pump seal.

4. Method according to claim 2, wherein four characteristic numbers are determined, comprising:
   a delivery number which is a relationship between a deviation from an ideal throughput of the pump and an ideal throughput;
   an energy number which is a relationship between an actual heat energy and an energy converted as a result of fluid friction;
   a load number which is a relationship between a bearing load and a bearing capacity; and
   a leak path number which is a relationship between differential pressures at an intake side, an output side, and upstream of a pump seal.

5. Method according to claim 1, wherein the characteristic numbers are determined in the local evaluation unit and only the characteristic numbers are transmitted to the central evaluation unit.

6. Method according to claim 2, wherein the characteristic numbers are determined in the local evaluation unit and only the characteristic numbers are transmitted to the central evaluation unit.

7. Method according to claim 3, wherein the characteristic numbers are determined in the local evaluation unit and only the characteristic numbers are transmitted to the central evaluation unit.

8. Method according to claim 4, wherein the characteristic numbers are determined in the local evaluation unit and only the characteristic numbers are transmitted to the central evaluation unit.

9. Method according to claim 1, wherein the central evaluation unit receives data over a first data channel from the local evaluation unit and acts on the pump and/or on the local evaluation unit via a second data channel.

10. Method according to claim 3, wherein the central evaluation unit receives data over a first data channel from the local evaluation unit and acts on the pump and/or on the local evaluation unit via a second data channel.

11. A device for monitoring an operating status, comprising:
   a pump to be monitored;
   a measuring device coupled to the pump to determine system parameters of the pump;
   at least one central evaluation unit remotely located from the pump;
   a local evaluation unit provided in a vicinity of the pump and coupled to the measuring device to receive the system parameters; and
   at least one data channel connecting said local evaluation unit with said at least one central evaluation unit;
   wherein said local evaluation unit comprises means for processing at least three of said system parameters into one or more characteristic numbers, said characteristic numbers being transmitted to said central evaluation unit; and
   wherein said central evaluation unit comprises means for determining at least one of a current or future operating status of the pump based on the characteristic numbers.

12. The device according to claim 11, wherein one data channel originating at the central evaluation unit is actively connected with the local evaluation unit and/or the pump.

13. Method according to claim 1, wherein said method steps monitor the operating status of each of several locally distributed pumps and trigger appropriate actions in accordance with the monitored operating status.

* * * * *